JOHN NORTH.
Improvement in Millstone-Dressing Guides.
No. 114,326. Patented May 2, 1871.
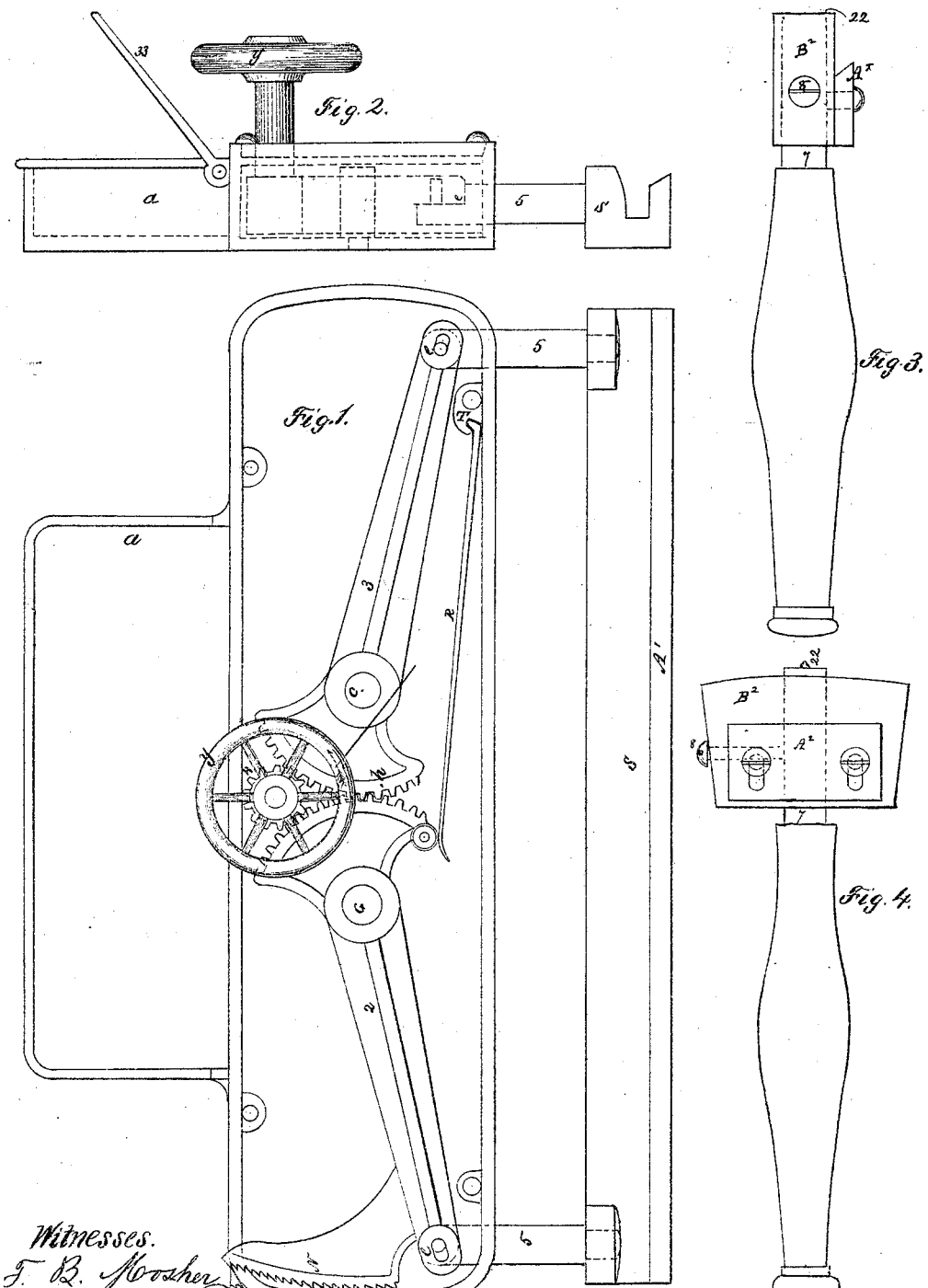

UNITED STATES PATENT OFFICE.

JOHN NORTH, OF NEW YORK, N. Y., ASSIGNOR TO A. H. HARRIS, OF CRESCO, IOWA.

IMPROVEMENT IN MILLSTONE-DRESSING GUIDES.

Specification forming part of Letters Patent No. 114,326, dated May 2, 1871.

*To all whom it may concern:*

Be it known that I, JOHN NORTH, of the city, county, and State of New York, have invented a new and useful Improvement in Diamond Millstone Parallel-Dressing Guide and Protector Machine, of which the following is a full, clear, and exact description, referring to the accompanying drawings, forming part of this specification, and in which—

Figure 1 is a plan or top view, having the cover removed, showing all the parts as combined. Fig. 2 is an end elevation of machine. Fig. 3 is the handle, to which the diamond point is attached with the adjustable protector. Fig. 4 is a transverse of Fig. 2, showing the adjustable guide.

Similar letters of reference indicate corresponding parts.

My invention consists of new and useful improvements in machine for making parallel lines on millstones with a diamond point.

Referring to the accompanying drawings, Fig. 1 represents a box-frame, made of cast-iron, being about one inch in depth, into which are placed sector-levers 2 and 3, which are geared together at $h$, and are hung on pivots $c\ c$. The long ends of the sector-levers, at $e\ e$, have a slotted hole, to which are hinged links 5 5, which are made fast to the parallel rule S. The sector-lever 2, at N, has ratchet-teeth cut in the radius of center pivot, $c$.

A spring, K, is attached to box-frame at $m$ by screw P, having a catch, 6, and is held in position against the ratchet N by the force of spring R, which is held in position by the hook at T, its spring end bearing on the rule $o$, as attached to sector 2.

The small pinion-gear 4 is hung to shaft, and, having a hand-wheel, $y$, attached, is geared to sector 2. On being turned in direction of the arrow it causes the sector-levers 2 and 3 to move up, and, moving the parallel rule one or more notches of the ratchet, as may be desired, is held fast by the action of spring R and the catch-spring K and ratchet N.

The parallel rule having a bevel edge to receive the adjustable guide $A^2$ when in position, and while being drawn across the rule, which is set so as to give the depth of cut made by the diamond point 2 2, the protector $B^2$, Figs. 3 and 4, having a round hole to receive the stem of the handle 7, will allow the diamond point to be changed in its position, this being desirable when worn or broken.

The adjustable protector $B^2$ is set so as to protect the diamond point in case it should slip off the end of rule.

The guide $A^2$ is adjusted so as to regulate the depth of the cut of diamond.

Attached to box-frame, Figs. 1 and 2, is a small box, $a$, having a lid, 3 3, into which the diamond-handle and protector are placed when not used.

The use of diamonds in lining millstones not being new, I do not claim it; nor the use of a parallel rule having a V shape; nor the diamond-holder having a protector and guide.

What I do claim is—

1. The combination of the box-frame sectors 2 and 3, pinion-gear 4, spring R, catch-spring K, circular ratchet N, links 5 5, and beveled rule S, when operated by the hand-wheel $y$, for the purposes specified.

2. The diamond-handle with a round stem, in combination with the adjustable protector $B^2$, having a round hole, with the adjustable guide, for the purposes described.

JOHN NORTH.

Witnesses:
T. B. MOSHER,
GEO. W. MABEE.